United States Patent
Koopman, Jr. et al.

[11] Patent Number: 5,952,937
[45] Date of Patent: Sep. 14, 1999

[54] SYSTEM AND METHOD OF UPDATING COMMUNICATIONS IN A SECURITY SYSTEM

[75] Inventors: Philip J. Koopman, Jr., Pittsburgh, Pa.; Roger D. Carroll, Burnsville, Minn.; Richard Grzybowski, Plantsville; Paul Marshall, Avon, both of Conn.

[73] Assignee: UT Automotive Dearborn, Inc., Dearborn, Mich.

[21] Appl. No.: 08/819,664

[22] Filed: Mar. 12, 1997

[51] Int. Cl.[6] ............................. G08C 19/00; B60R 25/04
[52] U.S. Cl. .............................. 340/825.72; 340/825.31; 340/825.34; 307/10.3; 307/10.5
[58] Field of Search .................................. 307/10.1, 10.2, 307/10.3, 10.4, 10.5, 10.6, 10.9; 340/825.31, 426, 425, 825.72, 825.34, 825.69

[56] References Cited

U.S. PATENT DOCUMENTS

| | | | |
|---|---|---|---|
| 3,706,094 | 12/1972 | Cole et al. | 342/44 |
| 4,719,460 | 6/1988 | Takeuchi et al. | 340/825.31 |
| 4,737,789 | 4/1988 | Nysen | 342/51 |
| 4,980,680 | 12/1990 | Knoll et al. | 340/825.31 |
| 5,684,339 | 11/1997 | Treharne | 307/10.5 |
| 5,723,912 | 3/1998 | Ahrabain et al. | 307/10.5 |
| 5,739,747 | 4/1998 | Flick | 340/426 |
| 5,774,065 | 6/1998 | Mabuchi et al. | 340/825.72 |

FOREIGN PATENT DOCUMENTS

| | | |
|---|---|---|
| 356720A1 | 3/1990 | European Pat. Off. . |
| 387581 | 9/1990 | European Pat. Off. . |
| 640517A1 | 9/1993 | European Pat. Off. . |
| 719682A1 | 12/1995 | European Pat. Off. . |
| 2296804 | 9/1995 | United Kingdom . |
| WO9302897 | 2/1993 | WIPO . |
| WO9620100 | 7/1996 | WIPO . |

*Primary Examiner*—Brian Zimmerman
*Assistant Examiner*—Jean B. Jeanglaude
*Attorney, Agent, or Firm*—Howard & Howard

[57] ABSTRACT

An anti-theft system includes a strategy for providing secure communications between a system controller and a remote signaling device. A communications initiator allows the transfer of information or signals between the system controlling and the remote signaling device only under predefined conditions. The system controller preferably includes a transmitter portion for transmitting signals or information to the remote device and a receiver portion for receiving signals from the remote device. Similarly, the remote device preferably includes a transceiver so that two-way communication is accomplished between the controller and the remote signalling device.

20 Claims, 1 Drawing Sheet

SYSTEM AND METHOD OF UPDATING COMMUNICATIONS IN A SECURITY SYSTEM

BACKGROUND OF THE INVENTION

In general terms, this invention relates to an anti-theft system where a remote signaling device, which can be mounted on a key for example, communicates with a system controller only under prescribed conditions.

Vehicle theft is a common and widespread problem. A variety of anti-theft systems have been developed and are commercially available. Typical systems include a remote signaling device that communicates with the anti-theft system mounted on the vehicle. In conventional systems, there is only one-way communication provided from the remote signaling device to the anti-theft system mounted on the vehicle. A variety of measures have been proposed to prevent sabotage or overriding the security of an anti-theft system. One such proposal includes using coded or encrypted communication signals from the remote device to the controller on the vehicle. Such solutions have not proven completely successful, however.

One possible way that the vehicle security systems are overridden is for a thief to use a signal capturing device to monitor a signal transferred from a remote device to a controller on a vehicle. By monitoring such signals, the thief can mimic or imitate the coded signal from the remote signaling device and, therefore, operate the vehicle security system in a manner that allows the thief to steal the vehicle.

A proposed solution to the above problem is to provide varying, encrypted signals from the remote device to the controller. These measures can prove prohibitively expensive when the remote device must contain sufficient memory for generating a varying signal. Further, even in situations where the remote device generates a varying signal, mathematical algorithms or multiple sampling schemes can be used to essentially break the code and disable the anti-theft system.

This invention addresses the needs and shortcomings of the systems discussed above. This invention provides a secure method of communicating between a remote device and a controller on a vehicle for operating an anti-theft system.

SUMMARY OF THE INVENTION

In general terms, this invention is a security system that provides a secure communicating link between a remote signaling device and an anti-theft system controller. A system designed according to this invention includes a controller that controls operation of the system and includes a transmitter portion that transmits a signal from the controller. The controller also includes a receiver portion that receives a signal from outside of the controller. A remote signaling device includes a transmitter portion that transmits a signal from the signaling device to the controller. The remote signaling device also includes a receiver portion that receives a signal from the controller transmitter portion. A communications initiator is included that determines whether a predefined condition exists and initiates a desired communication between the controller and the signaling device only when that predefined condition is satisfied.

The various features and advantages of this invention will become apparent to those skilled in the art from the following detailed description of the presently preferred embodiment. The drawings that accompany the detailed description can be described as follows:

DETAILED DESCRIPTION OF THE PREFERRED EMBODIMENT

Figure 1:
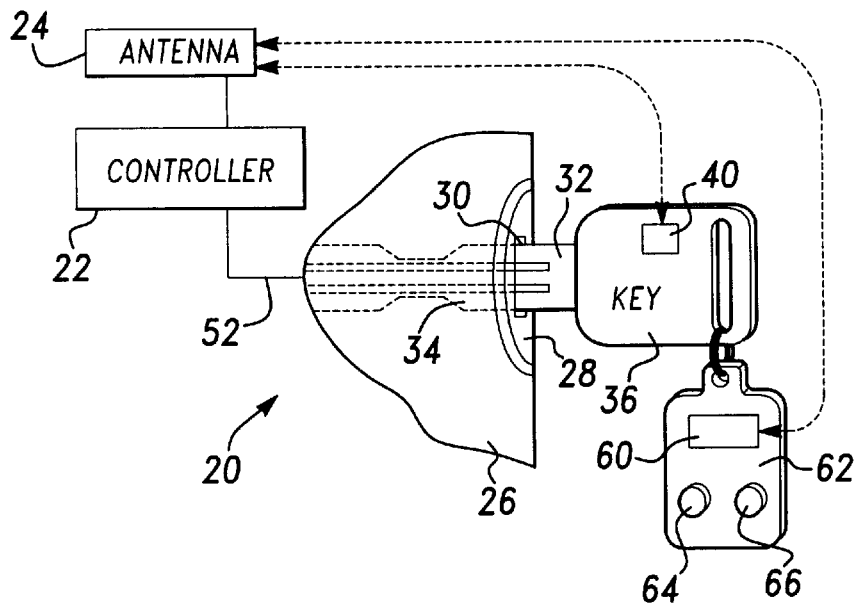
FIG. 1 is a schematic illustration of an anti-theft system designed according to this invention.

FIG. 1 schematically illustrates an anti-theft system 20. The system 20 can be used for preventing theft of a vehicle or, alternatively, could be used in connection with a home security system. A controller 22 is provided with an antenna 24 for communicating with remote signaling devices. The controller 22 is responsible for operation of the anti-theft system such as turning the system on or off and controlling the various operations of the system.

For purposes of illustration, the remainder of this discussion will assume that the anti-theft system 20 is used as a vehicle anti-theft system. A steering column 26 is shown partially and schematically in FIG. 1. The steering column 26 includes an ignition switch 28 that has a slot 30 for receiving a key 32. When the key 32 is appropriately positioned in the slot 30 a first portion 34 of the key extends into the steering column while a second, key top portion 36 remains outside of the slot 30. The key 32 is used to operate the ignition switch 28 in a conventional manner.

The key top portion 36 includes a remote signaling device 40. In the preferred embodiment, the remote device 40 is a transceiver that is capable of transmitting and receiving signals. The remote signaling device 40 communicates with the controller 22 such that the controller 22 operates the anti-theft system in a desired manner.

Figure 2:
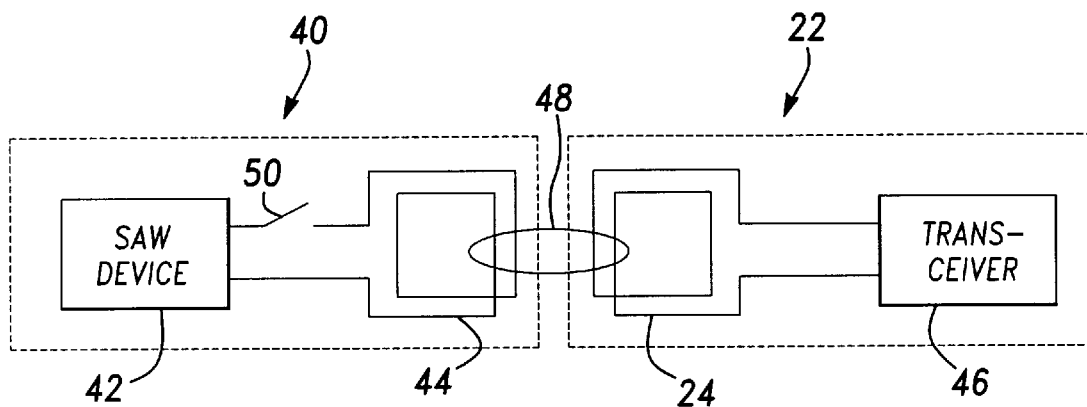
FIG. 2 is a schematic illustration of selected portions of one embodiment of a system designed according to this invention.

Referring now to FIG. 2, the controller 22 and the remote signaling device 40 are schematically illustrated in one preferred embodiment. The remote signaling device 40 includes a surface acoustic wave device 42. Other devices that operate at higher frequencies, such as bulk acoustic wave devices, could also be used. An antenna 44 is coupled to the surface acoustic wave device 42 for transmitting signals generated by the device 42 and for receiving signals from a transmitter portion 46 of the controller 22. Surface acoustic wave devices are known in the art. The ellipse 48 in FIG. 2 schematically illustrates a very limited communication range between the antenna 44 and the antenna 24. A limited communication range is provided to enhance the security of communications in the anti-theft system 20.

The remote signaling device 40 includes a communications initiator, which is schematically illustrated as a switch 50. The purpose of the communications initiator is to allow communication between the remote signaling device 40 and the controller 22 only under pre-defined conditions. In the illustrated embodiment, the pre-defined conditions would be that the key 32 is appropriately positioned within the slot 30 and the key is rotated to activate the ignition switch 28. In such an embodiment, a hard wire or physical connection 52 can be provided between the key and the controller 22. In such an embodiment, a direct communication link is established through the key from the controller 22 to the remote signaling device 40. The switch 50 can be positioned on the key in a manner such that the normal turning motion of a key when starting the ignition of a vehicle closes the switch and, therefore, allows communication between the remote signaling device 40 and the controller 22.

Alternative communications between the remote device 40 and the controller 22 is illustrated schematically by the broken line between the antenna 24 and the remote signaling device 40 (in FIG. 1). This communication can be accomplished using a radio frequency signal having limited range, an ultrasound signal, infrared, or magnetic induction.

As an alternative to providing the remote signaling device 40 on the key 32, the remote signaling device 60 can be provided on a key fob 62. Key fobs are becoming increasingly common in the vehicle market. The illustrated key fob (FIG. 1) includes two activation buttons 64 and 66, which can be used to activate/deactivate the anti-theft system and to unlock the door locks of the vehicle, for example. The remote signaling device 60 preferably includes a transmitter portion for sending signals to the controller 22 and a receiver portion for receiving signals or information from the controller 22. The two-way communication between the controller 22 and the remote signaling devices 40 and 60 provide enhanced security of the system as will now be described.

First, considering the embodiment where the remote signaling device 40 is mounted on the key top portion 36, the controller 22 sends a signal to the remote signaling device 40 to "poll" the remote device. This polling signal indicates to the remote signaling device 40 that it should transmit a signal back to the controller 22 to identify itself and instigate an operation of the anti-theft system so that the vehicle can be started. The normally open switch 50 is inserted in the circuit between the antenna 44 and the surface acoustic wave device 42 to eliminate unauthorized access to the coded signal that is generated by the transceiver 40. As mentioned above, the switch 50 can be strategically placed on the key top portion 36 so that it is only activated during a proper ignition cycle. This eliminates the possibility for someone else to send a "polling" radio frequency signal, for example, to the remote transceiver 40 while the key is in someone's pocket, for example. Without the switch 50 in a closed position, no communication is permitted from the surface acoustic wave device 42. Further, the range of communication 48 (in embodiments where radio frequency signals are used, for example) is purposefully limited to avoid someone outside of the vehicle from intercepting the communications between the controller 22 and the transceiver 40.

Although the illustrated embodiment includes an electrical switch, other communications initiators are within the scope of this invention. For example, a shorting bar across the antenna or an acoustic absorbing material placed on the surface acoustic wave device 42 would serve well to prevent unauthorized polling of the transceiver 40.

Accordingly, whether a physical link 52 is required between the key and the controller 22 or if signals such as radio frequency signals are used, a system designed according to this invention prevents unauthorized detection of the coded signals transmitted from the transceiver 40 to the controller 22.

Referring now to an example where the remote signaling device is provided in the transceiver 60, a secure communications channel is provided between the controller 22 and the transceiver 60. This example assumes that the fob 62 will be physically located within the vehicle when the vehicle is in operation. This assumption is valid since most fobs are used as key chains. The strategy of this embodiment of this invention is to periodically provide new, randomly generated secret information to the transceiver 60 so that the signal from the transceiver 60 to the controller 22 varies over time. In one embodiment, new information is provided to the transceiver 60 every time that the vehicle is in operation.

While the transceiver 60 is located within the vehicle, controller 22 uploads random, coded information to the transceiver 60 that will control a subsequent signal generated by the transceiver 60. The coded, uploaded information from the controller 22 preferably is generated in a completely random manner to avoid code-breaking or deciphering by a potential thief. Examples of ways to general random information include using the lowest bits of high-resolution timing of jittery physical events or using a set of LFSRs maintained by the vehicle that roll in response to unpredictable external events.

The communications between the controller 22 and the transceiver 60 preferably have a limited range so that a person outside of the vehicle cannot detect the information that is being uploaded to the transceiver 60. Examples of limited transmission technologies include magnetic induction, weak radio frequency signals, infrared and ultrasound. It is most preferred to enhance the security of the system by only performing an upload of information from the controller 22 to the transceiver 60 after the vehicle has been moving for a minimum time or distance. Under these circumstances, a potential thief would literally need to follow or chase the vehicle for some prescribed amount of time and try to intercept the uploaded information while in motion.

Additional security is provided by encrypting the uploaded information. In one example, the secret information that is being replaced by the upload provides a basis for the encryption of the new information. In the preferred embodiment, an upload to the transceiver 60 preferably is acknowledged so that the controller 22 can determine that a successful transmission was made and can accurately anticipate the next activation signal that will be received from the transceiver 60.

In some circumstances, multiple fobs may be provided, each having their own transceiver 60. In such an embodiment, each transceiver 60 preferably has a distinct set of secret information that is separately tracked by the controller 22. In such an embodiment, the controller 22 preferably determines which of the fobs it is communicating with to further enhance security. One method of accomplishing this is for the controller 22 to command the transceiver 60 to broadcast a radio frequency encrypted message just prior to uploading the information. The encrypted message would include an identifier of which transceiver the controller 22 is communicating with. This ensures that the controller 22 correctly tracks which transceiver the secret information is associated with and can, therefore, distinguish between different fobs.

To allow for the possibility for a fob to be used a moderate number of times between uploads, it is preferred to have some cryptographically secure message generating system that is used between uploads of secret information. Frequent uploads of randomly generated secret information reduces the practicality of a potential thief statistically determining an encryption method and breaking the code.

It is to be understood that the two example embodiments discussed above can be varied or combined in different fashions. For example, a transceiver on a key top may be uploaded with secret information on a routine basis along with providing an electrical switch as illustrated and discussed above. Those skilled in the art will appreciate that the controller 22 can be realized through conventional microprocessors. Similarly, achieving a communications instigator can be achieved through discrete elements (such as an electrical switch), software or a microprocessor that is part of the remote signaling device or the system controller 22.

The preceding description is exemplary rather than limiting in nature. Variations and modifications of the disclosed embodiments may become apparent to those skilled in the art that do not necessarily depart from the purview and spirit of this invention. Accordingly, the following claims must be studied to determine the scope of legal protection afforded this invention.

What is claimed is:

1. A vehicle security system, comprising:

a controller, supported on the vehicle, that controls the security system including a transceiver that generates a first signal and an encoding signal and an antenna coupled to said transceiver for transmitting said first signal and said encoding signal and for receiving signals from outside of said controller;

a vehicle ignition switch coupled to a key slot;

a key that is received in said slot to operate said ignition switch, said key including a transponder that receives and processes said first signal and generates an activation signal responsive to receiving said first signal; and a transponder initiator that enables said key transponder to generate said activation signal only when said key is received in said slot;

wherein said controller determines whether the vehicle has been in operation for a predetermined minimum amount indicative of time subsequent to said controller receiving and processing said activation signal, and then generates said encoding signal and wherein said transponder receives said encoding signal and modifies said activation signal according to said encoding signal and wherein said control responds to said modified activation signal to subsequently control the security system.

2. The system of claim 1 wherein a distance that the vehicle has been driven is indicative of time and said controller monitors the distance that the vehicle has been driven.

3. The system of claim 1, wherein said key transponder comprises a surface acoustic wave device that processes said first signal and generates said activation signal and an antenna that receives said first signal and transmits said activation signal to said controller.

4. The system of claim 3, wherein said transponder initiator comprises a shorting bar coupled across said antenna and wherein said shorting bar is disabled only when said key is received in said slot.

5. The system of claim 3, wherein said transponder initiator comprises an acoustic absorbing material coupled to said surface acoustic wave device and wherein said material is disabled only when said key is received in said slot.

6. The system of claim 3 wherein said transponder initiator is coupled between said surface acoustic wave device and said antenna and comprises a switch that is moveable between a first position where said antenna is coupled to said surface acoustic wave device and a second position where said antenna is not coupled to said surface acoustic wave device, said switch being moved into said first position to enable said key transponder to generator and transmit said activation signal.

7. The system of claim 6, wherein said switch is supported on said key such that movement of said key when said key is received in said slot moves said switch from said second position to said first position.

8. A security system, comprising:

a remote signalling device that includes a transmitter portion that transmits an activation signal from said signalling device and a receiver portion that is capable of receiving signals from a source outside of said signalling device;

a controller that controls operation of the security system and includes a transmitter portion that transmits an encoding signal from said controller and a receiver portion that receives said activation signal from said signalling device, said controller controlling the security system responsive to said activation signal received from said signalling device and subsequently determining that an operation condition has existed for a preselected minimum amount indicative of time and then transmits said encoding signal to said signalling device receiver portion and wherein said signalling device modifies said activation signal responsive to the received encoding signal.

9. The system of claim 8, wherein said signalling device is supported on a key fob.

10. The system of claim 8, wherein said signalling device is supported on a key.

11. The system of claim 8, further comprising a plurality of remote signalling devices and wherein said controller includes a tracking portion that determines which of said signalling devices receives said encoding signal and said controller subsequently only responds to a corresponding activation signal from a respective one of said signalling devices.

12. The system of claim 8, wherein said signalling device replaces an existing activation signal with a new activation signal responsive to said encoding signal.

13. The system of claim 8, wherein said security system is a vehicle security system and said controller is supported on a vehicle and said operation condition comprises a vehicle operation condition.

14. The system of claim 13, wherein the vehicle operation condition includes a vehicle engine being turned on for a preselected minimum amount of time.

15. The system of claim 13, wherein the vehicle operation condition includes the vehicle being driven a preselected minimum distance.

16. The system of claim 8, wherein said controller generates said encoding signal such that said encoding signal includes random, coded information.

17. The system of claim 16, wherein said controller generates said random, coded information using a set of LFSRs that are supported by the vehicle, said LFSRs rolling in response to external events.

18. The system of claim 16, wherein said controller generates said random, coded information using selected bits of high-resolution timing of jittery physical events.

19. A method of controlling a vehicle security system that includes a controller supported on the vehicle which controls the system and a remote signalling device that can be carried about by a user, comprising the steps of:

(A) generating an activation signal using the remote signalling device;

(B) controlling an operation of the security system using the controller responsive to the activation signal;

(C) determining whether a preselected vehicle operation condition exists after performing step (B);

(D) generating an encoding signal using the controller when the preselected operation condition of step (C) exists;

(E) updating the activation signal that is generated by the remote signalling device responsive to the encoding signal; and (F) subsequently controlling the operation of the security system using the controller only in response to the updated activation signal from the remote signalling device.

20. The method of claim 19, wherein the security system includes a plurality of remote signalling devices and the method comprises the further steps of determining which one of the remote signalling devices has most recently sent an activation signal to the controller;

performing steps (C) through (E) using the identified remote signalling device; and performing step (F) using the controller in response to the updated signal being received from only the identified remote signalling device.

* * * * *